J. F. DUGGAN.
SIGNALING APPARATUS.
APPLICATION FILED DEC. 5, 1914.
1,141,047.
Patented May 25, 1915.
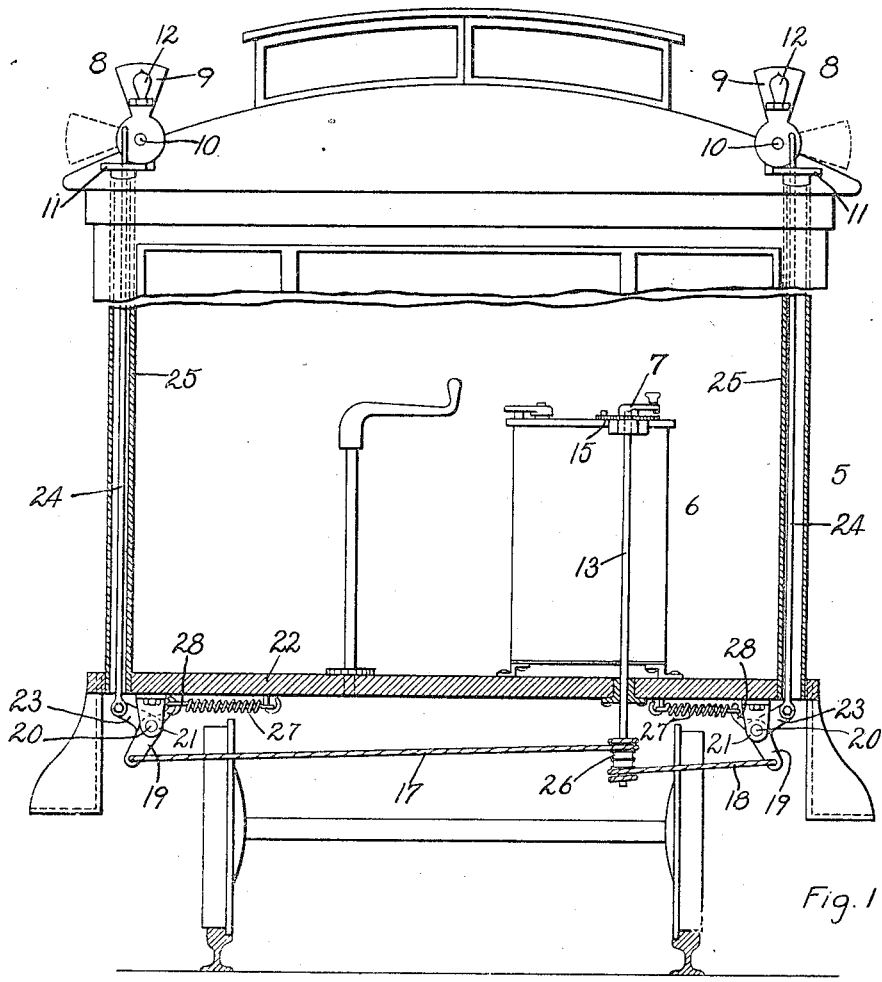
Fig. 1
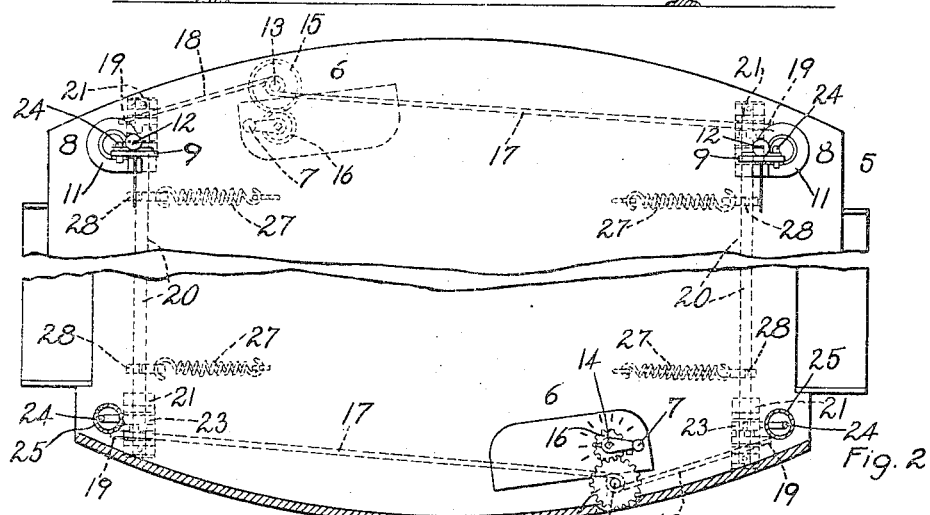
Fig. 2
Fig. 3
Witnesses
Herman R. Hoffman,
Leonard A. Powell.
Inventor
James F. Duggan,
by his attorney,
Charles A. Gooding.

UNITED STATES PATENT OFFICE.

JAMES F. DUGGAN, OF ATLANTIC, MASSACHUSETTS.

SIGNALING APPARATUS.

1,141,047.   Specification of Letters Patent.   Patented May 25, 1915.

Application filed December 5, 1914. Serial No. 875,707.

*To all whom it may concern:*

Be it known that I, JAMES F. DUGGAN, a citizen of the United States, residing at Atlantic, in the county of Norfolk and State of Massachusetts, have invented new and useful Improvements in Signaling Apparatus, of which the following is a specification.

This invention relates to improvements in signaling apparatus adapted more particularly for use on street cars and the like.

The object of the invention is to provide an apparatus which shall indicate to the operators of cars in advance or following the car bearing said signal, the condition of the power controlling mechanism of said car, that is to say, whether the power is turned on or off. With such a device the operator of a following car may be informed as to whether said car is about to slow down or stop, or whether said car is advancing under full power or any portion thereof, in which case suitable or sufficient warning will be given to the operator of the car following to stop his car and thus avoid a collision.

The object of the invention is still further to provide suitable connecting means for said indicator and the controller of the vehicle in order that the turning on or shutting off of the power to the operating instrumentalities of the car will be signaled by said indicator from the front and rear ends of the vehicle.

This invention consists in the combination and arrangement of parts set forth in the following specification and particularly pointed out in the claims.

Referring to the drawings: Figure 1 is an end elevation with parts broken away and other parts shown in section of a car with a device embodying my invention shown in connection therewith. Fig. 2 is a plan view with parts broken away and other parts shown in section of the car illustrated in Fig. 1. Fig. 3 is a detail view of one end of one of the shafts arranged beneath a car illustrating the clutch mechanism thereon.

Like numerals refer to like parts throughout the several views of the drawings.

The preferred embodiment of the invention, as illustrated in the drawings, consists of a vehicle 5 having a controller 6 arranged at each end thereof, said controllers being operated by the usual detachable operating lever 7, the construction of said controllers being so well known that it is believed no further description will be necessary.

It is the purpose of the invention to provide, upon some conspicuous part of the vehicle, indicators or signaling devices with at least one of said indicators visible from any point of view relatively to said vehicle and thereby warn those approaching the path of travel as to whether the vehicle is traveling with the power turned on, or whether said power is shut off preparatory to the stopping of said vehicle.

The preferred method of carrying out this feature of the invention is to provide an indicator 8 at each end, or preferably at the four corners of the vehicle and the preferred form of indicator consists of an arm 9 pivoted at 10 to a bracket 11 fast to the top of said vehicle. A light 12 is preferably attached to the arm of said indicator in such a manner as to illuminate the outer face of said indicator at night. To operate said pivot arm from its position in full lines Fig. 1 to that shown in dotted lines in said figure, means have been provided by which motion may be imparted thereto from the power controlling lever 7. This means consists preferably of a shaft 13 arranged substantially parallel with the axis of the controller shaft 14 and operatively connected with said shaft by a pair of gears 15 and 16 secured respectively upon the shafts 13 and 14. The shaft 13 extends downwardly through the floor of the vehicle and has connected thereto, at its lower end, two flexible connecting members 17 and 18 wound about said shafts 13 in the same direction, but extending therefrom in opposite directions to levers 19 mounted upon shafts 20. The shafts 20 preferably extend lengthwise of the body of the vehicle and are journaled to rotate in bearings 21, 21 suspended from beneath the floor 22 of the car.

Secured to the shafts 20 adjacent to each of the levers 19 are levers 23, the outer free ends of which are connected by links 24 to the pivot arms of the indicators 8, said links extending through casings 25 arranged adjacent to points on the vehicle where it is desired to locate the indicator arms, said arms being pivotally mounted upon the upper ends of said casings, whereby said links will be protected from injury. Thus it will be seen that these connections, with the shaft 13, will be operated by means of the controller arm 7 and the flexible connecting members 17 and 18 will be wound about the lower end of said shaft or preferably the drum 26 formed thereon, to rock the shafts 20 through the levers 19. The levers 23 on said shaft will also be rocked to swing the indicator arm 9 attached thereto from the position shown in full lines into the position shown in dotted lines, or to some intermediate position between the two shown, varying positions of said arm conveying to an observer the position of the controlling lever 7, that is to say, if the power is shut off the arm will be vertical, as shown in full lines, then as the lever 7 is rotated from its shut off position to its full speed position, said arm 9 will be moved to correspond. Springs 27 are connected to the shafts 20 for the purpose of returning them to their normal positions when the power is shut off by the movement of the lever 7, said springs being attached at their opposite ends to a stationary portion of the vehicle and to levers 28 secured to the shafts 20. It will be seen by referring to Fig. 2 that the shafts 20 are connected at their opposite ends to the controllers which are usually provided at the opposite ends of a street car, thus all of the signals connected with said shafts will be simultaneously operated from either end of said vehicle.

It is desirable that the gears 15 and 16 and shaft 13 remain stationary or be out of operation at the rear of the car when the equivalent members at the forward end of the car are being operated. To accomplish this result the levers 19 are each pivotally mounted upon the shafts 20 and provided with a projection 29 normally held in contact with corresponding projections 30 on the levers 23 by the springs 27, but when the shafts 20 are rocked by means of the levers 19 at one end of said shafts, the levers 19 at the opposite ends of the shafts will not be affected, for the reason that the projection 30 will be moved away from the projection 29 upon the inoperative lever 19, thus the energy required to operate the indicators will be somewhat lessened.

The apparatus hereinbefore specifically described has been shown in connection with an electrically operated street car constructed to travel along a restricted line of way. The use of the apparatus is not however limited to this particular type of vehicle, but may be successfully operated on motor vehicles and the several operatively connecting instrumentalities varied to suit the conditions of the vehicle upon which the apparatus is to be used.

Having thus described my invention what I claim and desire by Letters Patent to secure is:

1. The combination with a vehicle of an indicator pivotally mounted at opposite ends of said vehicle, a rotary power controlling lever, a shaft adjacent said power controlling lever, means operatively connecting said lever with said shaft, a second shaft, a lever mounted on said second shaft, a flexible member secured to said first named shaft and the end of said lever respectively and adapted to be wound about said first named shaft to operate said lever in one direction, a spring adapted to move said lever in the opposite direction, and means operatively connecting said second shaft with said indicator to cause said indicator to be moved simultaneously with said controller.

2. A signaling apparatus having, in combination, a plurality of indicators pivotally mounted upon the exterior of a vehicle, a power controlling lever at each end of said vehicle, a vertical shaft adjacent to each of said power controlling levers constructed and arranged to be rotated by said power controlling lever, a horizontal shaft extending longitudinally of said vehicle, levers mounted adjacent to opposite ends of said horizontal shaft, flexible members secured to each of said levers and adapted to be wound around the vertical shaft adjacent thereto during the operation of said power controlling lever to rock said horizontal shaft in one direction, a spring adapted to rock said horizontal shaft in the opposite direction and means operatively connecting said horizontal shaft with said indicators to move said indicators simultaneously with said power controlling lever.

3. The combination with a vehicle of an indicator pivotally mounted adjacent each corner of said vehicle, two horizontal shafts extending longitudinally of said vehicle, two levers mounted upon each of said horizontal shafts, a plurality of casings extending through said vehicle, means extending through said casings to operatively connect said shafts with said indicators, a controller at each end of said vehicle, a vertical shaft operatively connected with each of said controllers, flexible members extending from each of said vertical shafts to one of said levers on each of said horizontal shafts and constructed and arranged to transmit a rocking movement from either of said vertical shafts to each of said horizontal shafts simultaneously and springs adapted to return said horizontal shafts to their normal positions.

In testimony whereof I have hereunto set my hand in presence of two subscribing witnesses.

JAMES F. DUGGAN.

Witnesses:
SYDNEY E. TAFT,
MARGARET E. HORN.